Jan. 8, 1952     G. T. GADDIS     2,581,525
TEMPERATURE CONTROL APPARATUS
Filed July 17, 1948
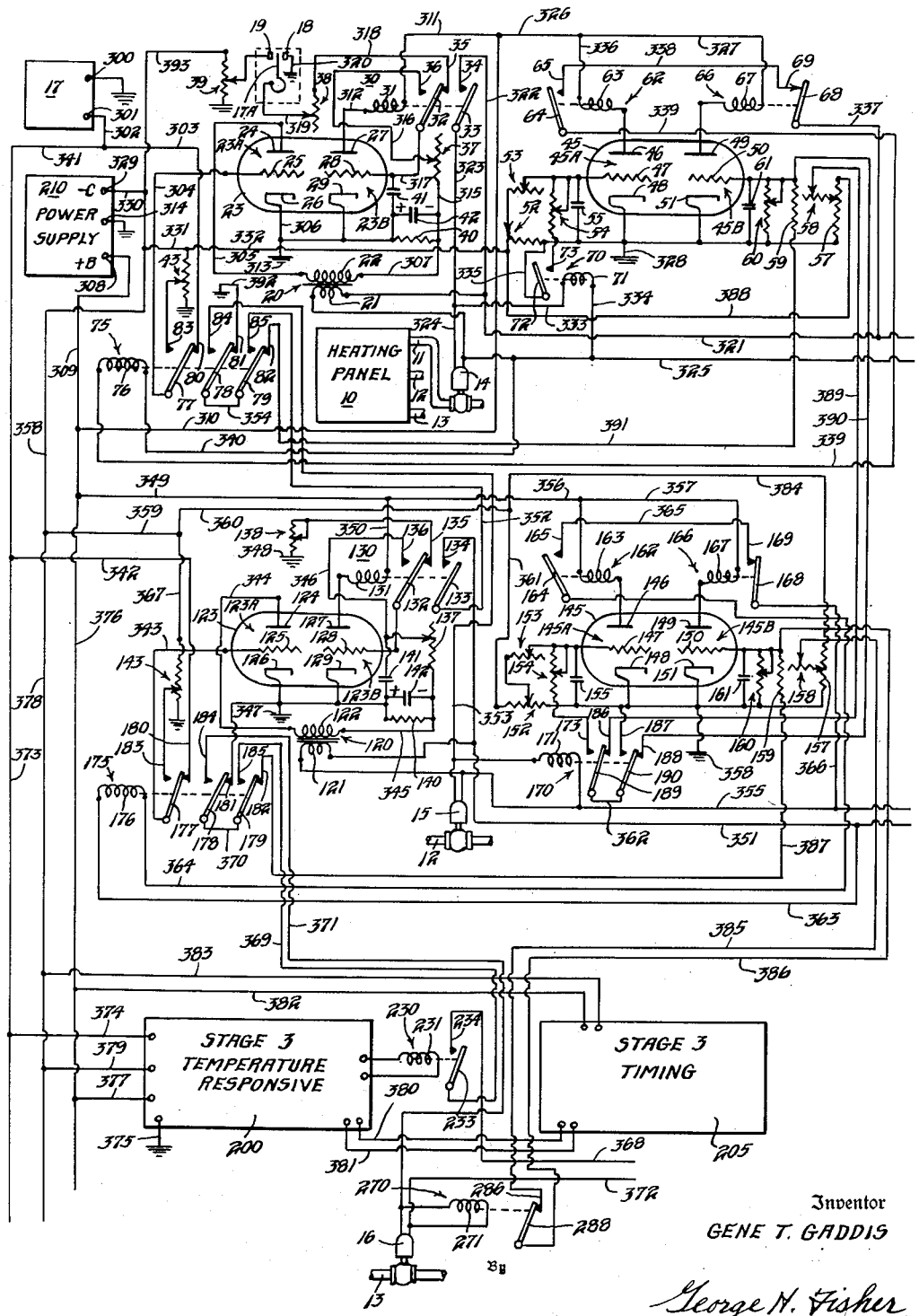
Inventor
GENE T. GADDIS
George N. Fisher
Attorney Patented Jan. 8, 1952

2,581,525

UNITED STATES PATENT OFFICE 2,581,525

TEMPERATURE CONTROL APPARATUS

Gene T. Gaddis, Minneapolis, Minn., assignor to Minneapolis-Honeywell Regulator Company, Minneapolis, Minn., a corporation of Delaware Application July 17, 1948, Serial No. 39,350

20 Claims. (Cl. 236—1)

The present invention relates to control apparatus and particularly to that type of control apparatus adapted for use in temperature control wherein it is desired to maintain a constant temperature within a given space under varying heat demand or load demand conditions.

In some present day heating systems it is customary to employ heating panels of the type that accomplish heating by radiation and convection. As these panels generally cover an entire wall surface or ceiling surface it is necessary to provide some method of modulating the heat flow to the panel in accordance with the load conditions which may be functions of such factors as outdoor temperature, room size, thermal heat loss, outdoor wind velocity and many others. The heating panel may be constructed of a number of heating elements that may be energized in accordance with existing load conditions. It is therefore desirable to energize only those elements needed to maintain the temperature within the space to be heated at a desired value.

The present invention is concerned with a control apparatus which is adapted to control the heating elements of a heating panel by continuously energizing a certain number of the heating elements in a series and periodically energizing the heating element next in series all in accordance with the load conditions determined by any desired type of heating load measuring apparatus.

It is therefore an object of the present invention to provide an improved control apparatus which will periodically energize a condition maintaining element for time periods determined by a condition load measuring device.

A further object of the present invention is to provide a control apparatus which will, when a predetermined load condition exists, energize continuously a series of a condition maintaining elements and energize periodically the next condition maintaining element in the series of elements in accordance with the load condition then existent.

Still another object of the present invention is to provide an electronic control device which is operable to cycle on and off a condition maintaining element in accordance with the voltage that exists in the input to the control apparatus.

A still further object of the present invention is to provide an electronic control apparatus which is rendered inoperative and operative in accordance with the charging and discharging rate of condensers whose charge is established by load condition measuring apparatus to energize a means for maintaining a desired temperature within a given space.

These and more detailed and specific objects will be disclosed in the course of the following specification, reference being had to the accompanying drawing on which is a diagrammatical showing of a heating panel, a temperature load condition measuring apparatus and the control circuit of my invention connected operatively thereto.

Referring to the single figure, the numeral 10 represents a heating panel which may be of the type utilizing steam as the heating source. Steam may be supplied to the heating panel by a plurality of conduits 11, 12 and 13. Controlling the flow of steam to the heating panel 10 are suitable electrical valves 14, 15 and 16 associated with the respective conduits 11, 12 and 13. The numeral 17 represents the heat demand indicating apparatus of any desired type which will have on its output terminals a voltage representative of the amount of heat that must be added to a space being heated to maintain a constant temperature. A thermal responsive bimetal 17A and associated contacts 18 and 19 are provided for maintaining the control apparatus inoperative when there is no output from the heat demand indicating apparatus 17 or when there is no need for operation of the control apparatus.

An alternating current power transformer 20, consisting of a primary winding 21 and a secondary winding 22, supplies power to one section 23A of a double triode vacuum tube 23 which consists of an anode 24, a control electrode 25, and a cathode 26. The second section 23B of the twin triode 23 consists of an anode 27, a control electrode 28, and a cathode 29. Located in the energizing circuit of the second section of the twin triode is a relay 30 having a relay energizing winding 31, a pair of switch blades 32 and 33 biased, by means not shown, so that the blade 32 engages a switch contact 35. A second pair of contacts 36 and 34 are provided for contacting switch blades 32 and 33 respectively, when the relay is energized. Potentiometers 37, 38, 39 and resistor 40 are provided for variably charging and discharging a pair of associated condensers 41 and 42. Potentiometer 43 is a biasing potentiometer.

A second dual triode tube is represented by the numeral 45 having two sections 45A and 45B and may be seen to consist of, in the left hand section or section 45A, an anode 46, a control electrode 47, and a cathode 48 while in the right hand section 45B, it consists of an anode 49, a control electrode 50, and a cathode 51. Associated with the input circuit of the left hand section 45A of the dual triode 45 are potentiometers 52, 53 and 54 which cooperate with condenser 55 to establish the bias potential between control electrode 47 and cathode 48. Associated with the right hand section 45B of the dual triode 45 is a resistor 59 and potentiometers 57, 58 and 60, all of which cooperate with condenser 61 to establish the biasing potential on the right hand section of the dual triode 45. A relay 70 consists of a relay winding 71 and a switch blade 72 biased out of engagement with contact 73 by means not shown. A coupling relay 75 consists of a relay winding 76, switch blades 77, 78 and 79 biased respectively into engagement with contacts 80, 81 and 82 by means not shown. Contacts 83, 84 and 85 are provided for association with switch blades 77, 78 and 79 respectively when relay 75 becomes energized.

The second electronic circuit in the series of control circuits of my invention is almost identical to that which has already been described above and corresponding components carry the same reference numeral with a 1 preceding the numeral to designate the second stage. The second stage may be seen to consist of an alternating current power transformer 120, having a primary winding 121 and a secondary winding 122, supplying energy to the left-hand section 123A of a dual triode 123. The triode section 123A may be seen to consist of an anode 124, a control electrode 125 and a cathode 126. The right hand section 123B of dual triode 123 may be seen to consist of an anode 127, a control electrode 128, and a cathode 129. Connected in the output of triode 123B is a relay 130 having an energizing winding 131 and associated switch blades 132 and 133 with switch blade 133 biased out of contact with its associated contact 134 and switch blade 132 biased into engagement with contact 135. A switch contact 136 is associated with blade 132 when relay 130 is energized. The input circuit to triode 123B consists of a pair of potentiometers 137 and 138 associated with a resistor 140 and a pair of condensers 141 and 142. The potentiometer 143 is associated with the input circuit to the triode 123A. A further dual triode 145 consists of a left-hand triode section 145A having an anode 146, a control electrode 147, and a cathode 148 and a right hand triode section 145B having an anode 149, a control electrode 150 and a cathode 151. Associated with the input to amplifier 145A are potentiometers 152, 153 and 154 which cooperate with a condenser 155 for biasing triode 145A into and out of conduction. The input section to triode 145B consists of potentiometers 157, 158, and 160 associated with a resistor 159 and a condenser 161 for regulating the conductivity of the triode 145B. The output relay for triode 145 is relay 162 having a relay winding 163 and an associated switch blade 164 biased out of engagement with its associated contact 165. The output relay for the triode section 145B is a relay 166 having a relay winding 167 and an associated switch blade 168 which is normally biased out of engagement with its associated switch contact 169. A timing control relay 170 consists of a relay winding 171 having a pair of switch blades 189 and 190 normally biased into engagement with a pair of switch contacts 186 and 188. Switch contacts 173 and 187 are associated with switch blades 189 and 190 respectively when relay 170 is energized.

For purposes of simplification a third stage associated with my control apparatus is shown in block diagram form with only that portion of the diagram shown that is directly associated with the previous stages. The numeral 200 represents the temperature responsive section of my control apparatus while the numeral 205 represents the timing or coupling section of my control apparatus. The output relay 230 corresponds to relay 30 of stage 1 and relay 130 of stage 2 and may be seen to consist of a relay winding 231 having a switch blade 233 normally biased out of engagement with its associated contact 234. A timing relay 270 corresponds in part to relays 70 and 170 and may be seen to consist of a relay winding 271 and a switch blade 288 biased into engagement with an associated switch contact 286. Supplying direct current power and biasing voltages for all of my control apparatus is a suitable power supply carrying the reference numeral 210.

*Operation*

In discussing the operation of my invention, it will be well to keep in mind that my control apparatus is for modulatingly controlling the energization of the heating panel 10. For purposes of illustration, assume that for light load conditions it is desirable to supply steam to panel 10 through conduit 11 periodically and that for medium load conditions it will be necessary to supply steam continuously to panel 10 through conduit 11 and periodically through conduit 12. Similarly, assume that for heavy load conditions, it is desirable to supply steam to conduit 11 and conduit 12 continuously while supplying steam periodically through conduit 13.

The light load conditions will be considered first, that is when steam is periodically supplied to panel 10 through conduit 11 only. The heat demand indicating device 17 associated with my invention is preferably of the type which has a voltage output representative of the amount of heat that must be supplied to maintain a constant temperature within a given space. With this, it will be assumed that the voltage on the output terminals when measured from ground 300 to terminal 301 will become more negative with increases in demand for heat. Assuming further that when the relays on the diagram are in the position shown, the voltage appearing across the terminals of indicator 17 is applied to the input circuit to tube 23A to operatively bias the same in accordance with the voltage on the output terminals of the demand indicator 17. This circuit may be traced from the terminal 301 through conductors 302 and 303, switch contact 80, switch blade 77, and conductor 304 to control electrode 25 of triode 23A. The current flow circuit for triode 23A may be traced from the left hand terminal of the secondary section 22 through conductor 305, anode 24, cathode 26, conductor 306, resistor 40 and conductor 307 back to the right hand terminal of secondary 22. The amount of current flow through this last traced circuit will be a function of the voltage that is appearing upon the control electrode 25 which, as explained above, is biased by demand indicating means 17. The current flow through the triode 23A in flowing through the resistor 40 serves to place a charge on the condenser 42 such that its left hand terminal is positive and its right hand terminal is negative. The magnitude of this voltage will be a function of the conductivity of the triode 23A.

The charge on condenser 42 is directly associated with the biasing circuit for triode 23B. The plate current circuit for triode 23B may be traced from the terminal 308 of the power supply 210 through conductors 309, 310 and 311, relay winding 31, conductor 312, anode 27, cathode 29, and ground 315 back to ground terminal 314 of the power supply. Assume that the relay 30 has just become energized by current flowing in the last trace circuit and the switch blade 32 has moved into engagement with switch contact 36. At the instant this occurs the condenser 41 which is connected directly between the cathode 29 and control electrode 28 has a charge on it which permits the current flow through triode 23B to energize the relay 30. With relay 30 energized as in the above traced circuit a charging path for condenser 41 is established from the condenser 42 and this circuit may be traced from the right hand terminal of the condenser 42 through conductor 315, potentiometer 37, conductor 316, switch blade 32, and conductor 317 to condenser 41. Since there is resistance in the last traced charging circuit for condenser 41, there will be a time delay in the charging of this condenser which will depend upon the setting of the tap of the potentiometer 37. When condenser 41 starts to charge it will become more negative on its upper terminal and tend to bias the control electrode 28 more negative. Due to the differential between the current flow required to energize relay 30 and the current flow required to maintain the relay energized it is possible to shift the bias of triode 23B over a certain voltage range without deenergizing relay 30. The time that it takes the charge on condenser 41 to shift from the relay energizing point to the relay drop out point will depend upon the resistance of potentiometer 37 and the capacity of capacitor 41 as well as the charge on condenser 42. As soon as the condenser 41 has been charged sufficiently negative the current flow in triode 23B will drop below the relay 30 current holding point and relay 30 will become deenergized.

When relay 30 becomes deenergized the switch blade 32 moves into engagement with switch contact 35 to establish a discharge circuit for condenser 41. The discharge circuit for condenser 41 may be traced from the upper terminal of condenser 41 through conductor 317, switch blade 32, switch contact 35, conductor 318, resistor 38, conductor 319, bimetal 17A, which under conditions calling for operation of the heating panel 10 is engaging switch contact 18, ground conductor 320 and ground 313 back to the lower terminal of the condenser 41. It will be noted that in the last traced circuit there is a potentiometer 38 which has a variable tap which may be used to determine the rate of discharge of the condenser 41. As soon as the condenser 41 has discharged sufficiently the control electrode 28 will be raised in potential to a point where relay 30 will again become energized. From the foregoing it can be seen that the relay 30 will be energized and deenergized for periods of time determined by the charge on condenser 42 and the amount of resistance in the charging and discharging circuit for condenser 41.

Assume for the moment that the load indicating device 17 has an output which is indicating that there should be a longer operation of the heating panel. As explained above, the voltage output on terminal 301 will become more negative upon greater demand for heat. This more negative signal will bias the triode 23A to be less conductive than previously. With the triode 23A conducting less there will be a smaller direct current charge built up on the condenser 42. With a smaller charge on condenser 42 the relay 30 will be maintained in the energized position longer since it will take longer for the condenser 41 to charge to a point where it will drop the conductivity of the triode 23B below that required to maintain relay 30 energized. Each time the relay 30 is moved into the energized position the switch blade 33 moves into contact with its associated contact 34 and completes an energizing circuit for the steam valve 14. The circuit to this valve 14 may be traced from the input power line 321 through conductor 322, switch contact 34, switch blade 33, conductor 323, conductor 324, and valve 14 back to the other input power line 325.

From the foregoing, it can be seen that when the demand indicating device 17 is operating in a range of values between light load and moderate load, the relay 30 and the steam valve 14 will be cycled on and off for time periods whose lengths will be dependent upon the output signal from the indicator 17. As soon as the demand indicating device 17 indicates that there is need for more heat than can be supplied by the periodic operation of the steam valve 14 a timing or coupling stage comes into operation. This timing stage is directly concerned with the triode stage 45A and triode stage 45B and the operating circuits therefore. This timing stage is so interconnected with the control apparatus that it will be operative to cause continuous operation of the relay 30 and initiate periodic operation of relay 130 in the second stage of operation.

In discussing the operation of this timing stage, it will be assumed that the triode 45B is conducting so that a plate current circuit may be traced from the terminal 308 of the power supply 210 through conductor 309, conductor 310, conductors 326 and 327, relay winding 67, anode 49, cathode 51, and ground 328, back to ground terminal 314 of the power supply. With triode 45B conducting, the relay 66 will be energized and the switch blade 68 will be moved into engagement with its associated contact 69. The triode 45A will be assumed to be nonconducting; this is because the control electrode 47 is connected effectively directly to the biasing terminal 329 of the power supply 210. This circuit may be traced from the terminal 329 through conductors 330, 331 and 332, potentiometer 52, and potentiometer 53 to control electrode 47. The actual bias on the tube 45A will be dependent upon the position of the tap of the potentiometer 52. The triode 45A will remain effectively nonconducting until the biasing voltage on the triode is altered. The altering of this biasing voltage is accomplished by the relay 70 which is energized when the steam valve 14 is energized. The energizing circuit for this relay 70 may be traced from the input power line 321, conductor 322, switch contact 34, switch blade 33, conductors 323 and 333, relay winding 71 and conductor 334 back to the other input power line 325. When relay 70 becomes energized the associated switch blade 72 is moved into engagement with contact 73 to establish a discharge circuit for the condenser 55 which is actually the biasing condenser for triode 45A. The discharge circuit may be traced from the upper terminal of the condenser 55 through the potentiometer 54, switch contact 73, switch blade 72, conductor 335 back to the lower terminal of condenser 55. With the discharging circuit for condenser 55 established, a further voltage divider network is provided for the biasing voltage supply from the power supply 210. This voltage divider network actually consists of the potentiometers 53 and 54 in series so that now, with relay 70 energized, the voltage across condenser 55 will eventually discharge from the value that was established solely by potentiometer 52 to a value that will be established by the voltage divider consisting of potentiometers 53 and 54.

As soon as the condenser 55 has discharged to the new point established by the voltage divider the tube 45A will become conductive. The time that it takes for condenser 55 to discharge will be dependent upon the RC time constant of the condenser 55 and the resistor potentiometer 54. This time constant is so chosen that it will not permit condenser 55 to discharge below the relay energizing point until it is necessary to bring into operation the second stage of operation. In other words, when the time periods of operation of relay 30 exceed a predetermined value which indicates the needs for operation of the second stage, it is necessary to have condenser 55 discharge to the point where triode 45A will conduct.

The conducting circuit for the triode 45A may be traced from the power supply 210 at terminal 308 through conductor 309, 310, 326 and 336, relay winding 63, anode 46, cathode 48, and ground 328 back to ground 314 of the power supply. With triode 45A conducting sufficiently the relay 62 will become energized and the switch blade 64 will move into engagement with its associated switch contacts 65. When switch contact 65 engages switch blade 64 an energizing circuit is established to the coupling relay 75. This energizing circuit may be traced from the input power line 321 through conductors 337, switch blade 68, switch contact 69, conductor 338, switch contact 65, switch blade 64, conductor 339, relay winding 76, and conductor 340 back to the other input power line 325.

When relay 75 becomes energized the switch blades 77, 78 and 79 move into engagement with their associated switch contacts 83, 84 and 85 respectively. When the switch blade 77 engages contact 83 a new biasing circuit is established for the triode 23A. This biasing circuit may be traced from the biasing terminal 329 of the power supply 210 through conductors 330 and 331, potentiometer 43, switch contact 83, switch blade 77 and conductor 304 to control electrode 25. This biasing voltage is so chosen as to render the triode 23A effectively nonconducting. With the triode 23A effectively nonconducting, the voltage that was formerly on condenser 42, due to the current flow through triode 23A, will not be present so that the triode 23B will have no voltage to move the control electrode 28 below the relay 30 drop out point. This means that the relay 30 will remain energized with switch blade 33 engaging switch contact 34 and maintaining the steam valve 14 continuously in operation.

The apparatus is now in a position to permit periodic operation of the second stage at steam valve 15. The control circuits effecting the energization of the steam valve 15 are almost identical to those employed in the first stage for energizing steam valve 14. There is one main difference in the operation of the control circuits for the first stage and the control circuits for the second stage and that is that the time constant of the RC timing networks are so chosen that the second stage is operative periodically only over a middle range of load demand signals from the indicating device 17.

The controlling signal for the second stage of operation originates from the load indicating device 17 and is coupled to the control electrode 125 of the triode 123 by a circuit that may be traced from the terminal 301 of indicator 17 through conductors 302, 341 and 342, switch contact 180, switch blade 177, and conductor 343 to control electrode 125. The conducting circuit for the triode 123A may be traced from the left hand terminal of the secondary winding 122 through conductor 344, anode 124, cathode 126, resistor 140, and conductor 345 back to the right hand terminal of the secondary section 120. The flow of current through the resistor 140 in the last traced circuit results in a charge being placed on condenser 142, which charge will have a magnitude dependent upon the conductivity of the triode 123A. The charge on the condenser 142 is effective to bias the triode 123B into and out of conduction in accordance with the charging and discharge time of the condenser 141, which is connected directly across the control electrode-cathode circuit of the triode 123B.

The charging circuit for the condenser 141 may be traced from the right hand terminal of the condenser 142 through potentiometer 137, conductor 346, switch contact 136, switch blade 132, and condenser 141 back to the left hand terminal of condenser 142. The discharge circuit for condenser 141 may be traced from the upper terminal of condenser 141 through switch blade 132, switch contact 135, potentiometer 138, ground 348, and ground 347 back to the lower terminal of the condenser 141. The energizing circuit for the triode 123B may be traced from the terminal 308 of the power supply 210 through conductors 309, 349, and 350, relay winding 131, anode 127, cathode 129, ground 347, and ground 314 of the power supply. It will be noted from the above discussion that when the relay 130 is energized and the switch blade 132 is moved into engagement with switch contact 136, the condenser 141 will be charging through potentiometer 137 so that its upper terminal is becoming more negative and the voltage on the condenser 141 is tending to bias the control electrode 128 below the point required to maintain relay 130 energized. As soon as the bias on condenser 141 drops the control electrode potential below the relay holding current the switch blade 132 will move into engagement with switch contact 135. With switch blade 132 engaging switch contact 135 a discharging bias is established for the condenser 141 and this discharge circuit is through the potentiometer 138 whose tap may be adjusted to vary the discharge time of the condenser 141 and thereby regulate the off time of the relay 130.

Also energized when the relay 130 is energized is the steam valve 15 whose energizing circuit may be traced from the input power line 351 through switch contact 134, switch blade 133, conductor 352, switch contact 85, switch blade 79, conductor 354, switch blade 78, switch contact 84, conductor 353, and steam valve 15 back to the other input power line 355. It will be noted that the steam valve circuit may be completed only when the coupling relay 75 is in its energized position since this coupling relay prevents the steam valve 15 from cycling periodically until there is continuous operation of the steam valve 14. From the foregoing, it can be seen that the relay 130 will cycle the steam valve 15 on and off at a rate determined by the load demand indicated by the indicator 17 and this cycling will become effective only when there is continuous operation in the first stage of the heating system.

Should the demand indicating device 17 be indicating a load that calls for continuous operation of the first and second stages and periodic operation of the third stage it is necessary to bring into operation the second timing stage and coupling stage the former of which consists of the dual triode 145 and its associated circuits and the latter of which consists of the coupling relay 175. In first observing the operation of the timing stage, it will be assumed that the triode section 145B is conducting so that the relay 166 located in the plate circuit of the triode 145B is energized. The plate circuit for the triode section 145B may be traced from the terminal 308 of the power supply 210 through conductors 309, 349, 356 and 357, relay winding 167, anode 149, cathode 151 and ground 358 back to ground terminal 314 of the power supply. With relay 166 energized the switch blade 168 will be engaging switch contact 169.

It will further be assumed that the triode section 145A is effectively non-conducting and its associated plate relay 162 is not energized. This will be because the grid 147 of the triode 145A is biased below the relay energizing point by a connection directly to the bias supply of the power supply 210. This circuit may be traced from the terminal 329 of the power supply through conductors 330, 358, 359, 360 and 361, potentiometer 152, and potentiometer 153 to control electrode 147. As long as the potentiometer 154 is not connected across the condenser 155, the condenser 155 will have a biasing voltage on it that will be dependent upon the position of the tap on potentiometer 152. This biasing voltage will maintain the current flow in the triode 145A below the relay energizing point.

The potentiometer 154 is connected across the condenser 155 whenever the steam valve 15 is energized by the relay 130. This is accomplished by the relay 170 whose energizing circuit may be traced from the input power line 355 through relay winding 171, conductor 353, switch contact 84, switch blade 78, conductor 354, switch blade 79, switch contact 85, conductor 352, switch blade 133, and switch contact 134 back to the other input power line 351. When relay 170 is energized, the switch blade 189 and 190 move into engagement with contacts 173 and 187 respectively. This will complete a discharge circuit for the condenser 155 that may be traced from the upper terminal of condenser 155 through potentiometer 154, switch contacts 173, switch blade 189, conductor 362, switch blade 190, and switch contact 187 back to the lower terminal of the condenser 155. The potentiometer 153 and potentiometer 154 now form a voltage divider which will establish a new biasing voltage for the control electrode 147 to which it will be necessary for the condenser 155 to discharge to. The discharging time of the condenser 155 is so selected that the condenser will not discharge sufficiently to bias the triode 145 to the relay energizing point until the steam valve 15 remains energized for a length of time indicating there is need for an additional stage to be brought into operation. When the steam valve does remain energized for a predetermined length of time, the condenser 155 will be discharged sufficiently to bias the triode 145 to the relay energizing point. The plate current circuit for the triode 145A may be traced from terminal 308 of power supply 210 through conductors 309, 349, and 356, relay winding 163, anode 148, cathode 148, ground 358 back to ground 314 of the power supply. When the plate current reaches a certain value in the last traced anode circuit, the relay 162 will become energized and will move switch blade 164 into engagement with switch contact 165. With switch blade 164 engaging switch contact 165 an energizing circuit will be completed to the coupling relay 175 which may be traced from input power line 355 through conductor 366, switch blade 168, switch contact 169, conductor 365, switch contact 165, switch blade 164, conductor 364, relay winding 176 and conductor 363 back to the other input power line 351.

When the coupling relay 175 becomes energized, the switch blades 177, 178 and 179 move into engagement with their associated contacts 183, 184 and 185 respectively. When switch blade 177 engages switch contact 183, a new biasing circuit is established for the triode 123A to effectively cut the tube off, or below the current conductive point. This new biasing circuit may be traced from the terminal 329 of the power supply 210 through conductors 330, 358, 359, and 367, potentiometer 143, switch contact 183, switch blade 177, and conductors 343 to the control electrode 125. When there is no current flow through the triode 123A there will be no biasing voltage placed on the condenser 142 so that when the relay 130 is energized the control electrode 128 will be effectively at cathode potential and the triode 123B will continue to pass current and maintain relay 130 energized continuously which will mean that the steam valve 15 will now be operating continuously.

With the second stage steam valve 15 operating continuously, it is desirable to permit periodic operation of the third stage steam valve 16. For purposes of simplification, the third stage of operation has been shown in block diagram form, but in actual practice the third stage would be constructed identically to the second stage of operation with the RC time constants of the timing circuits altered so that the demand indicating device 17 would be operative to cycle a third stage on and off only when there is a large demand for heat.

The relay 230 in the third stage of operation corresponds to the relay 130 in the second stage of operation and is operative when energized to move the switch blade 233 into engagement with the associated contact 234. This will complete an energizing circuit for steam valve 16 that may be traced from the input power line 368 through switch contact 234, switch blade 233, conductor 369, switch contact 185, switch blade 179, conductor 370, switch blade 178, switch contact 184, conductor 371, and steam valve 16 back to the other input power line 372. As in the case with the steam valves 14 and 15, the steam valve 16 will be cycled in accordance with the signal that is sent from the demand indicating device 17 whose circuit may be traced from the terminal 301 through conductors 302, 341, 373, and 374 to the stage 3 temperature responsive section 200. The power supply for the temperature responsive stage 200 may be traced from the power supply from terminal 308 through conductors 309, 376 and 377 to the temperature responsive device 200 to ground terminal 375 and back to the ground terminal 314 of the power supply. The biasing voltage for the third stage also originates in the power supply 210 and may be traced from the terminal 329 through conductors 330, 358, 378 and 379 to temperature responsive section 200.

In the event that it is desired to have additional stages of operation, it is necessary to provide a timing and coupling circuit in the third stage which is shown as numeral 205 in block diagram form and corresponds identically to the timing and coupling stage of stage 2. This is shown to be operatively interconnected with the temperature responsive section of stage 3 by conductors 380 and 381 and to be connected to the power supply 210, conductors 376 and 378 by conductors 382 and 383. In the event that a fourth stage were provided, it would be operatively inter-connected with stage 3 so that stage 3 would be rendered operative continuously while the fourth stage was operating periodically, in the same manner as occurs between the continuous operation of stage 2 and the periodic operation of stage 3. The fourth stage would of course be responsive to a further range of load demand signals from the indicating device 17. Obviously, any number of stages could be provided and they would be inter-connected as the above stages are connected.

The operation that has been explained thus far has been concerned solely with the conditions that exist when the load indicating device 17 is increasing its heat demand signal so that the first stage moves from operating periodically to operating continuously with the second stage operating periodically. And further, the second stage was considered to be operating continuously and the third stage operating periodically. It is now necessary to consider the operation of the apparatus when the load indicating device 17 is decreasing its demand for heat which will mean that it is desired to discontinue operation of certain of the heating elements that have been already energized. Let it be assumed that the steam valve 14 and steam valve 15 are operating continuously and that the steam valve 16 is being energized periodically. The decoupling with the steam valve 16 operating periodically will be initiated by the relay 270 which will be operating periodically since the relay 270 is connected directly across the power line supplying energy to the steam valve 16 so that when the steam valve 16 is energized the relay 270 is energized. When the relay 270 is deenergized, the switch blade 288 moves into engagement with switch contact 286 to complete a circuit in the decoupling stage of the second stage timing circuit common to the input of the triode 145B. Up to this time it has been assumed that the triode 145B has been continuously conducting, when the relay 270 is deenergized, switch blade 288, closing with switch contact 286, completes a new biasing circuit for the triode 145B that may be traced from the terminal 329 of the power supply 210, through conductors 330, 358, 359, 360, and 384, potentiometer 157, potentiometer 158, conductor 385, switch contact 286, switch blade 288, conductor 386, to the control electrode 150. It will be noted that the condenser 161 is connected directly across the input or control electrode cathode circuit of the triode 145B so that it effectively establishes the biasing potential of the triode 145B. It will be further noted that the last traced biasing circuit from the power supply 210 through relay 270 includes a potentiometer 158. The resistance of this potentiometer is so chosen that the RC time constant of the potentiometer 158 and the condenser 161 will not permit the current flow in the triode 145B to drop below the current flow necessary to maintain relay 166 energized until it is desired to discontinue operation entirely in the third stage of operation. This will occur when the time periods of operation of the third stage have dropped below a predetermined value. This may best be understood by noting that condenser 161 has a discharge circuit through potentiometer 160 which will discharge the condenser 161 when the relay 270 is energized. When the relay 270 is deenergized, the condenser 161 is charged through the potentiometer 158 so that it will tend to bias the tube 145B in a direction to decrease the current flow through the tube below the point necessary to maintain relay 166 energized. The time that relay 270 is deenergized is always constant since the off periods of operation are constant as explained above. As soon as the relay 270 becomes energized again, the charging circuit for condenser 161 will be broken and it will start to discharge through the potentiometer 160. If the time the relay 270 is energized is relatively short, the condenser 161 will not have fully discharged and the subsequent deenergization of relay 270 and the resultant completion of the charging circuit for condenser 161 will permit the condenser to charge to a point where it will bias triode 145B below the point necessary to maintain relay 166 energized.

When the relay 166 becomes deenergized the switch blade 168 will move out of engagement with its associated switch contact 169 to open the energizing circuit for the coupling relay 175. When the coupling relay 175 becomes deenergized the biasing circuit for the triode 123A is switched back to the load demand indicating device 16 by movement of the switch blade 177 into engagement with switch contact 180. When switch blades 178 and 179 move out of engagement with their associated switch contacts 184 and 185, respectively, the energizing circuit for steam valve 16 will be open so that it will be impossible to energize the steam valve 16 until the relay 175 is once again energized.

Deenergization of the relay 175 effectively connects resistor 159 across the input circuit to the triode 145B. This circuit may be traced from the lower terminal of the resistor 159 through conductor 387, switch contact 182, switch blade 179, conductors 370, switch blade 178, switch contact 181, and ground 347 to ground 358. With the resistor 159 connected in parallel with the potentiometer 160, a new voltage divider network is established across the input to the triode 145B so that the bias voltage from the power supply 210 will now be divided across the potentiometer 158 connected in series with the parallel combination of resistor 159 and potentiometer 160. This new biasing voltage across the resistor 159 and potentiometer 160 is also placed across the condenser 161 and is of such a value that it will permit the current flow through the triode 145B to reenergize the relay 166. There will be a certain amount of time delay involved from the discharging of condenser 161 through the parallel combination of resistor 159 and potentiometer 160 which is necessary to permit the condenser 155 associated with the input of triode 145A to discharge below the point necessary to maintain relay 162 energized. As explained above, it will be seen that the potentiometer 154 will be disconnected from the discharging circuit for condenser 155 when the relay 170 is deenergized. It will be seen that the relay 162 must be deenergized before relay 166 is again energized to permit the coupling stage from becoming operative again. This is taken care of by providing an operating differential between the point of operation calling for periodic operation in the third stage and the point calling for periodic operation in the second stage. In other words, the relay 166 will become deenergized only when a load demand signal is impressed which will maintain the operation of the second stage for periods of time less than that required to energize relay 162. The time delay of the condenser 161 discharging through the parallel connected resistor 159 and potentiometer 160 is such that the second stage will have gone through an operating cycle so that the charge on condenser 155 will have been altered, by the connection to the bias supplied through contacts of relay 170, to shift the bias of triode 145A below the point necessary to maintain relay 162 energized. With relay 162 deenergized, the switch blade 164 will move out of engagement with its associated contact 165 to maintain the energizing circuit for the coupling relay 175 inoperative when the relay 166 once again becomes conductive after the condenser 161 has discharged to the relay current biasing energizing point.

With relay 162 deenergized, the apparatus will be operating under that range of values where the second stage will be cycling on and off periodically and the first stage will be operating continuously.

In the event that there is a further decrease in demand for heat indicated by the indicator 17 such that it is desirable to operate only the first stage periodically, it will be necessary to decouple the second stage from the first and this is accomplished in practically the same manner as the third stage was decoupled from the second. Like relay 270, the relay 170 is a decoupling relay which, when in the deenergized position, moves switch blades 189 and 190 into contact with their associated contacts 185 and 188 to complete a biasing circuit for the control electrode 50 of the triode 45B. This biasing circuit may be traced from the terminal 329 of the power supply 210 through conductors 330, 331, 332, and 388, potentiometer 57, potentiometer 58, conductor 389, switch contact 186, switch blade 189, conductor 362, switch blade 190, switch contact 188, and conductor 390 to the control electrode 50. This last traced circuit, like the corresponding circuit of the input to triode 145B is completed through the potentiometer 58 whose resistance when cooperating with the conductor 61 forms an RC timing network which will function to bias the triode 45B below the point required to maintain the relay 66 energized.

Normally, the condenser 61 will discharge through the potentiometer 60 when the biasing circuit is not connected to the control electrode 50 and the condenser 61 will again be charged when the biasing potential is again connected to the control electrode 50. Under these conditions, the voltage of condenser 61 will not build up to a point where it will cut the current flow in triode 45B below the point necessary to deenergize relay 66. However, as soon as the on time of the steam valve 15 and the resultant opening in the biasing circuit for the control electrode 50 becomes less than a predetermined value the condenser 61 will not be fully discharged through potentiometer 60 so that upon the next deener-gized portion of the operating cycle of relay 170 and steam valve 15 the biasing circuit will be connected long enough to the control electrode 50 so that the condenser 61 will be charged to a biasing voltage which will cut the current flow in triode 45B below the point necessary to maintain relay 66 energized. When relay 66 becomes deenergized the switch blade 68 moves out of contact with its associated switch contact 69 to open the energizing circuit to the coupling relay 75.

When the coupling relay 75 becomes deenergized, the biasing circuit on the triode 23A is connected back to the temperature load indicating device 17 by a switch blade 77 engaging the associated switch contact 80. Also deenergized, when the coupling relay 75 becomes deenergized, is the energizing circuit to the steam valve 15 since the switch blades 78 and 79 move out of engagement with switch contacts 84 and 85, respectively. When switch blades 78 and 79 engage their deenergized contacts 81 and 82 respectively a voltage divider network is connected into the biasing circuit of the triode 45B by connecting the resistor 59 in parallel with the potentiometer 60. This parallel connection may be traced from the resistor 59 through conductor 391, switch contact 82, switch blade 79, conductor 354, switch blade 78, switch contact 81, to ground 392 back to ground 328. With the resistor 59 connected in parallel with the potentiometer 60, the condenser 61 will tend to charge to a value that will bias the triode 45B to a point where the relay 66 will once again become conductive. As was the case with relay 162 and relay 166, the relay 62 must be deenergized before the relay 66 is again energized to permit the coupling stage from becoming operative. As explained above, this is taken care of by providing an operating differential between the point of operation calling for periodic operation of the second stage at the point calling for periodic operation only in the first stage. In other words, the relay 66 will become deenergized only with a load demand signal present which will maintain the operation of the first stage for periods of time less than that required to energize relay 62. The time delay in the condenser 61 discharging through the parallel resistor 59 and potentiometer 60 is such that the first stage will have gone through an operating cycle so that the charge on condenser 55 will have been altered, by the connection to the bias supplied through the contacts of relay 70, to shift the bias of triode 45A below the point necessary to maintain relay 62 energized. When the relay 62 becomes deenergized, the switch blade 64 moves out of engagement with its associated contact 65 to maintain the energizing circuit for the coupling relay 75 deenergized when the relay 66 once again becomes conductive. The control apparatus is now operating periodically in the first stage and is not operating at all in either the second or the third stages.

When the load condition indicated by indicator 17 no longer exists, it is desirable to provide some means of discontinuing operation of the apparatus. This may be accomplished by the bimetal 17A which is operable to move into engagement with contact 18 when there is a demand for heat and into engagement with contact 19 when there is no demand for heat. The operation as discussed so far has assumed that the bimetal has been engaging contact 18. With the heating demand non-existent and the bimetal 17A engaging contact 19 the biasing circuit of the power supply 210 may be traced from the terminal 329 through conductors 330 and 393, potentiometer 39, switch contact 19, bimetal 17, conductor 319, potentiometer 38, conductor 318, switch contact 35, switch blade 32, and conductor 317 to control electrode 26. This biasing potential maintains the current flow in the triode 23B below that point necessary to energize relay 30 and will maintain triode 23B so biased until such time as the bimetal 17A once again moves in the heat demanding direction and contacts contact 18 to form the discharging circuit for the biasing condenser 41.

From the foregoing it can be seen that a control apparatus has been provided for effectively modulating the heat flow through a heating panel in accordance with the demand for heat. It can be further seen that the control apparatus has been provided to cycle into operation a series of heat controlling devices to maintain a constant temperature within a given space.

Although I have discussed my invention in connection with a particular type of steam heating panel, and while it is particularly well adapted for use there, it will be obvious to those skilled in the art that my invention could be applied to any apparatus where it is desirable to modulatingly control a condition in accordance with load demand indicating means. Therefore, I intended to be limited solely by the scope of the appended claims, in which I claim:

1. A condition control device comprising in combination, a plurality of load control devices, load demand sensing means, means interconnecting said load sensing means and said load control devices so that sensing means is operable to energize said load control devices, a plurality of coupling means, and means connecting said coupling means in between each of said load control devices so that said coupling means is operable to maintain each successive device of said load control devices operating periodically and all preceding of said devices operating continuously in accordance with the load demand indicated by said load sensing means, each of said control devices including circuit means controlled by said load demand sensing means modulatingly varying the periodic operation of said devices.

2. A condition control apparatus comprising in combination, a load condition sensing means, a plurality of interconnected condition control devices each adapted to energize periodically or continuously condition changing means, each of said control devices including circuit means controlled by said load demand sensing means modulatingly varying the periodic operation of said device, means interconnecting each of said condition control devices and said sensing means, a plurality of coupling means, and means connecting a separate one of said coupling means between each of said condition control devices and being operable to energize each succeeding of said condition control devices periodically when the condition control device preceding said coupling means is operating continuously.

3. A condition control apparatus comprising in combination, a load condition sensing means, a plurality of interconnected condition control devices each adapted to energize periodically or continuously condition changing means, means interconnecting each of said condition responsive devices and said sensing means, a plurality of coupling means, means connecting said coupling means between each of said condition control devices and being operable to energize each succeeding of said condition control devices periodically when the condition control device preceeding said coupling means is operating continuously, further load condition sensing means, and means connecting said further sensing means in circuit with the first of said series connected condition control devices to maintain said first condition control device inoperative when the load condition is nonexistent.

4. A condition control apparatus comprising in combination, load condition sensing means, a plurality of interconnected condition control devices, each of said devices being operable to energize condition maintaining means periodically or continuously, means connecting said load condition sensing means to each of said condition control devices so that each of said condition control devices is operable in periods of modulatingly increasing length for increases in load measured by said sensing means, means common to each of said condition control means to initiate energization of each of said control means periodically for different ranges of load, coupling means, and means connecting each of said coupling means between each of said condition control devices to maintain each of said control devices preceding said coupling means operative continuously when the load condition has exceeded the periodic operating range for said preceding responsive device.

5. A condition control apparatus comprising in combination, a load condition sensing means, first condition control means adapted to energize condition changing means, means interconnecting said load condition sensing means and said condition control means, first timing means common to said first condition control means being operable to maintain said condition control means operable for varying periods of time proportional to values in a first range of load values indicated by said sensing means, second condition control means adapted to energize further condition changing means, coupling means, means including said coupling means interconnecting said first and second condition control means and operative to maintain said second condition control means operative when the time period of the periodic operation of said first condition control means has exceeded a predetermined value, means coupling said load sensing means to said second condition control means, and second timing means associated with said second condition control means and being operable to maintain said condition control means operable for varying periods of time proportional to values in a second range of load values indicated by said sensing means.

6. A condition control apparatus comprising in combination, a load condition sensing means, first condition control means adapted to energize condition changing means, means interconnecting said load condition sensing means and said condition control means, first timing means common to said first condition control means being operable to maintain said condition control means operable for varying periods of time proportional to values in a first range of load values indicated by said sensing means, second condition control means adapted to energize further condition changing means, coupling means, means including said coupling means interconnecting said first and second condition control means and operative to maintain said second condition control means operative when the time period of the periodic operation of said first condition control means has exceeded a predetermined value, means coupling said load sensing means to said second condition control means, second timing means associated with said second condition control means and being operable to maintain said condition control means operable for varying periods of time proportional to values in a second range of load values indicated by said sensing means, and means common to said coupling means connected between said first and second condition control means for maintaining said first condition control means operative continuously when said second condition control means is operating periodically.

7. A condition control apparatus comprising in combination, a load condition sensing means, first condition control means adapted to energize condition changing means, means interconnecting said load condition sensing means and said condition control means, first timing means common to said first condition control means being operable to maintain said condition control means operable for varying periods of time proportional to values in a first range of load values indicated by said sensing means, second condition control means adapted to energize further condition changing means, coupling means, means including said coupling means interconnecting said first and second condition control means and operative to maintain said second condition control means operative when the time period of the periodic operation of said first condition control means has exceeded a predetermined value, means coupling said load sensing means to said second condition control means, second timing means associated with said second condition control means and being operable to maintain said condition control means operable for varying periods of time proportional to values in a second range of load values indicated by said sensing means, means common to said coupling means connected between said first and second condition control means for maintaining said first condition control means operative continuously when said second condition control means is operating periodically, and a plurality of further condition control means operatively connected in series with said first and second condition control means so that said devices will respond to a plurality of ranges of load conditions measured by said sensing means exceeding the ranges wherein said first and second condition control means is operative.

8. A temperature maintaining control apparatus comprising in combination, demand indicating means being operative to indicate the amount of heat needed to maintain a constant temperature in a given space and having an output which remains constant for a given heat demand, first and second electron discharge devices, means connecting said demand means to said first electron discharge device to regulate the conductivity of said first electron discharge device, circuit means including contacts of electrical switching means connected common to said first and second electron discharge devices so that said second electron discharge device is rendered operative or inoperative in time periods of varying length in accordance with the conductivity of said first electron discharge device, and means energized by the operation of said second electron discharge device for rendering heating means operative in a temperature maintaining sense.

9. A temperature maintaining control apparatus comprising in combination, demand indicating means being operative to indicate the amount of heat needed to maintain a constant temperature in a given space, first and second electron discharge devices, means connecting said demand means to said first electron discharge device to regulate the conductivity of said first electron discharge device, circuit means connected common to said first and second electron discharge devices so that said second electron discharge device is rendered operative or inoperative in time periods of varying length in accordance with the conductivity of said first electron discharge device, means energized by the operation of said second electron discharge device for rendering heating means operative in a temperature maintaining sense, a coupling means, third and fourth electron discharge devices, means connecting said demand indicating means to said third electron discharge device for regulating the conductivity of said third electron discharge device, further circuit means connected common to said third and fourth electron discharge devices so that said fourth electron discharge device is rendered operative or inoperative in accordance with the conductivity of said third electron discharge device, further means energized by said fourth electron discharge device for rendering additional heating means operative in a temperature maintaining sense, and means including said coupling means for rendering said fourth electron discharge device effective only when the time periods of operation of said second electron discharge device exceed a predetermined value.

10. A temperature maintaining control apparatus comprising in combination, demand indicating means being operative to indicate the amount of heat needed to maintain a constant temperature in a given space, cycling means being operable to operate in cycles of varying time periods and energize heating means, means connecting said indicating means to said cycling means to variably adjust the time periods of operation of said cycling means, an electron discharge device, said device being operable when energized to disconnect said indicating means from said cycling means, means connected common to said device and said cycling means for energizing said discharge device only when the time period of operation of said cycling means exceeds a predetermined value, and means actuated by the energization of said discharge device to alter the operation of said cycling means from cycling operation to continuous operation.

11. A temperature maintaining control apparatus comprising in combination, demand indicating means being operative to indicate the amount of heat needed to maintain a constant temperature in a given space, cycling means being operable to operate in cycles of varying time periods and energize heating means, means connecting said indicating means to said cycling means to variably adjust the time periods of operation of said cycling means, first and second electron discharge devices, said first discharge device being normally nonconducting and said second discharge device being normally conducting, a second cycling means being operable to energize further heating means in cycles of varying time periods, means connecting said second cycling means to said indicating means to variably adjust the time periods of operation of said second cyling means, means common to the outputs of said first and second discharge devices for disconnecting said indicating means from said first named cycling means and altering the operation of said cycling means from cycling to continuous operation, means common to said first discharge device and said first named cycling means for energizing said first discharge device only when the time periods of operation of said first named cycling means exceeds a predetermined value, and means in circuit with said second cycling means for rendering said second cycling means effective only when said first named means is operating continuously.

12. A temperature maintaining control apparatus comprising in combination, demand indicating means being operative to indicate the amount of heat needed to maintain a constant temperature in a given space, cycling means being operative to operate in cycles of varying time periods and energize heating means, means connecting said indicating means to said cycling means to variably adjust the time periods of operation of said cycling means, first and second electron discharge devices, said first discharge device being normally nonconducting and said second discharge device being normally conducting, a second cycling means being operable to energize further heating means in cycles of varying time periods, means connecting said second cycling means to said indicating means to variably adjust the time periods of operation of said second cycling means, means common to the outputs of said first and second discharge devices for disconnecting said indicating means from said first named cycling means and altering the operation of said cycling means from cycling to continuous operation, means common to said first discharge device and said first named cycling means for energizing said first discharge device only when the time periods of operation of said first named cycling means exceeds a predetermined value, and means in circuit with said second cycling means for rendering said second cycling means effective only when said first named means is operating continuously.

13. A temperature maintaining control apparatus comprising in combination, demand indicating means being operative to indicate the amount of heat needed to maintain a constant temperature in a given space, cycling means being operable to operate in cycles of varying time periods and energize heating means, means connecting said indicating means to said cycling means to variably adjust the time periods of operation of said cyling means, first and second electron discharge devices, said first discharge device being normally nonconducting and said second discharge device being normally conducting, a second cycling means being operable to energize further heating means in cycles of varying time periods, means connecting said second cycling means to said indicating means to variably adjust the time periods of operation of said second cycling means, means common to the outputs of said first and second discharge devices for disconnecting said indicating means from said first named cycling means and altering the operation of said cycling means from cycling to continuous operation, means common to said first discharge device and said first named cycling means for energizing said first discharge device only when the time periods of operation of said first named cycling means exceeds a predetermined value, means in circuit with said second cycling means for rendering said second cycling means effective only when said first named means is operating continuously, and further means actuated by said second cycling means for rendering said second cycling means ineffective and said second discharge device nonconducting when said indicating means indicates a demand less than that indicated when said second cycling means was rendered effective.

14. A temperature control device comprising in combination; heat demand indicating means having an output signal whose magnitude corresponds to the amount of heat required to maintain a constant temperature within a given space; a plurality of heat energizing circuit means, each of said means comprising first and second electron discharge devices having anodes, cathodes and control electrodes, a source of power, a resistor, a condenser, means connecting said resistor and said condenser in parallel, means connecting said condenser in a closed series circuit with said source of power and said first discharge device so that said first discharge device is operable when conducting to charge said condenser, means connecting said indicating means to the control electrode of said first discharge device to regulate the flow of current through said series circuit, a second resistor, a second condenser, means connecting said second resistor and condenser in a control electrode cathode circuit of said second discharge device and to said first named condenser so that said second condenser will be charged by said first named condenser at a rate determined by said second resistor, a relay operable when energized to energize heating means, means connecting said relay in the conducting circuit of said second discharge device so that said relay is energized when the current flow through said second discharge device exceeds a predetermined value, further means associated with said relay for discharging said second condenser at a predetermined rate so that said relay is energized and deenergized for time periods determined by the charging and discharging of said second condenser, coupling means, means connecting said coupling means between each of said energizing circuit means, and timing means common to each of said coupling means being operable to maintain all energizing circuit means preceding said coupling means operable continuously and the energizing circuit succeeding said coupling means operable in accordance with the signal from said indicating means when said indicating means has an output within a predetermined range.

15. A condition control apparatus for use with a load condition sensing means, comprising, a plurality of interconnected condition control devices each adapted to energize periodically or continuously means for maintaining a condition at a desired value, each of said control devices including circuit means controlled by said load demand sensing means modulatingly varying the periodic operation of said device, means for connecting each of said condition control devices to the sensing means, a plurality of coupling means, and means connecting a separate one of said coupling means between each of said condition control devices and being operable to energize each succeeding of said condition control devices periodically when the condition control device preceding said coupling means is operating continuously.

16. A condition control apparatus for use with a load condition sensing means, comprising, first control means adapted to energize means for maintaining a controlled condition within a desired range, means for interconnecting the load condition sensing means and said condition control means, timing means common to said first condition control means being operable to maintain said condition control means operative for varying periods of time proportional to the load indicated by the sensing means, second condition control means adapted to energize further means for maintaining a condition within a desired range, coupling means, and means including said coupling means interconnecting said first and second condition control means and operative to maintain said second condition control means operative when the operational time period of the periodic operation of said first condition control means has exceeded a predetermined value.

17. A temperature maintaining control apparatus for use with a demand indicating means which indicates the amount of heat needed to maintain a constant temperature in a given space and having an output signal which remains constant for a given heat demand, comprising, first and second electron discharge devices, means for connecting the demand means to said first electron discharge device to regulate the conductivity of said first electron discharge device, circuit means including contacts of electrical switching means connected common to said first and second electron discharge devices so that said second electron discharge device is periodically rendered operative at a predetermined rate in accordance with a predetermined fixed degree of conductivity of said first electron discharge device, and means energized by the operation of said second electron discharge device for rendering heating means operative in a temperature maintaining sense.

18. In a control apparatus for controlling the operation of at least two condition changing devices in accordance with a control signal which varies with load demand, the combination comprising, first means for effecting periodic or continuous operation of the changing devices in a sequential manner so that one of said devices will be operating continuously and the other of said devices will be operating periodically, said periods of periodic operation being of increasing length for increasing load, circuit means connected to said first means for causing said other of said devices to become operative periodically when the controlling signal reaches a first value, and means including said circuit means for causing said first means to discontinue periodic operation of said other device and effecting periodic operation of said one device when the controlling signal changes from said first values to a second value.

19. Apparatus for controlling a condition having an input control signal which varies with load demand and which is adapted to control a plurality of condition changing means, the combination comprising, a first control means for controlling one of the condition changing means, timing means whose timing operation is controlled by the input signal to said apparatus connected in controlling relation to said first control means causing said control means to energize the associated changing means for time periods of variable length, a second control means for controlling a further of said condition changing means, and means including said timing means connected to said first and second control means for maintaining said second control means inoperative when said first control means is operating periodically until the time periods of operation of the first control means exceeds a predetermined value when the second control means is rendered operative periodically and the first control means operative continuously.

20. Apparatus for controlling a condition having an input signal which varies with load demand and which is adapted to control a condition changing means, comprising in combination, a control means which is adapted to effect operation of the condition changing means, and timing means whose timing operation is controlled by the magnitude of the input signal to the apparatus connected to periodically energize said control means, said timing means comprising a first electron discharge device whose conductivity is controlled by the input signal, a condenser connected to said device and receiving a charge which varies with the conductivity of said first device, a second electron discharge device connected in controlling relation to the input of said second device, and means including said control means alternately connecting said timing condenser to said first named condenser and to a discharging circuit so that said second device will be operative for periods of variable length dependent upon the value of the input signal.

GENE T. GADDIS.

REFERENCES CITED

The following references are of record in the file of this patent:

UNITED STATES PATENTS

| Number | Name | Date |
|---|---|---|
| 1,044,269 | Shaler | Nov. 12, 1912 |
| 2,175,945 | Simpson | Oct. 10, 1939 |
| 2,329,636 | McGrath | Sept. 14, 1943 |
| 2,335,071 | Lynch | Nov. 23, 1943 |
| 2,423,541 | Wilson et al. | July 8, 1947 |
| 2,429,916 | Belgan | Oct. 28, 1947 |
| 2,505,565 | Michel et al. | Apr. 25, 1950 |

FOREIGN PATENTS

| Number | Country | Date |
|---|---|---|
| 504,773 | Germany | Aug. 7, 1903 |